United States Patent
Bart et al.

(10) Patent No.: US 12,230,111 B2
(45) Date of Patent: Feb. 18, 2025

(54) CONTROL ACCESS UTILIZING VIDEO ANALYTICS

(71) Applicant: Alarm.com Incorporated, Tysons, VA (US)

(72) Inventors: Gary Franklin Bart, Weston, FL (US); Dean Constantine, Ft. Lauderdale, FL (US)

(73) Assignee: Alarm.com Incorporated, Tysons, VA (US)

( * ) Notice: Subject to any disclaimer, the term of this patent is extended or adjusted under 35 U.S.C. 154(b) by 63 days.

(21) Appl. No.: 17/835,452

(22) Filed: Jun. 8, 2022

(65) Prior Publication Data

US 2022/0301401 A1     Sep. 22, 2022

Related U.S. Application Data

(63) Continuation of application No. 15/995,596, filed on Jun. 1, 2018, now Pat. No. 11,373,494.

(Continued)

(51) Int. Cl.
| | |
|---|---|
| *G08B 13/196* | (2006.01) |
| *G06T 7/00* | (2017.01) |
| *G06T 7/73* | (2017.01) |
| *G06V 20/52* | (2022.01) |
| *G06V 40/16* | (2022.01) |
| *G08B 13/19* | (2006.01) |

(Continued)

(52) U.S. Cl.
CPC ...... *G08B 13/19602* (2013.01); *G06T 7/0002* (2013.01); *G06T 7/74* (2017.01); *G06V 20/52* (2022.01); *G06V 40/172* (2022.01); *G08B 13/19* (2013.01); *G08B 13/19695* (2013.01); *G08B 25/08* (2013.01); *H04N 7/18* (2013.01); *H04N 7/186* (2013.01); *G06T 2207/10016* (2013.01); *G06T 2207/20076* (2013.01);

(Continued)

(58) Field of Classification Search
CPC .............. G08B 13/19602; G08B 13/19; G08B 13/19695; G08B 25/08; G06T 7/0002; G06T 7/74; G06T 2207/10016; G06T 2207/20076; G06T 2207/30196; G06T 2207/30201; G06T 2207/30232; G06V 20/52; G06V 40/172; H04N 7/18; H04N 7/186

See application file for complete search history.

(56) References Cited

U.S. PATENT DOCUMENTS

| | | | |
|---|---|---|---|
| 2007/0014439 A1* | 1/2007 | Ando | G08B 31/00 382/118 |
| 2007/0042804 A1 | 2/2007 | Ryley et al. | |

(Continued)

OTHER PUBLICATIONS

Extended European Search Report in European Appln. No. 18810731.2, mailed May 8, 2020, 10 pages.

(Continued)

*Primary Examiner* — Amara Abdi
(74) *Attorney, Agent, or Firm* — Fish & Richardson P.C.

(57) ABSTRACT

A computer-implemented method including receiving, by a monitoring system that is configured to monitor a property and from a touchless doorbell device that includes a camera and a motion sensor, an image, analyzing, by the monitoring system, the image, based on analyzing the image, determining that the image likely includes a representation of a person, and based on determining that the image likely includes a representation of a person, performing a monitoring system action.

20 Claims, 6 Drawing Sheets

Related U.S. Application Data

(60) Provisional application No. 62/513,588, filed on Jun. 1, 2017.

(51) Int. Cl.
*G08B 25/08* (2006.01)
*H04N 7/18* (2006.01)

(52) U.S. Cl.
CPC ............... *G06T 2207/30196* (2013.01); *G06T 2207/30201* (2013.01); *G06T 2207/30232* (2013.01)

(56) References Cited

U.S. PATENT DOCUMENTS

| | | | |
|---|---|---|---|
| 2013/0247175 A1* | 9/2013 | Nechyba | G06F 21/32 726/19 |
| 2014/0016835 A1* | 1/2014 | Song | G10L 17/06 382/118 |
| 2015/0029335 A1 | 1/2015 | Kasmir et al. | |
| 2015/0049191 A1* | 2/2015 | Scalisi | H04N 7/188 348/143 |
| 2016/0105644 A1 | 4/2016 | Smith et al. | |
| 2016/0180667 A1 | 6/2016 | Bunker et al. | |
| 2016/0203370 A1 | 7/2016 | Child et al. | |
| 2017/0220872 A1* | 8/2017 | Child | G08B 13/196 |
| 2018/0276961 A1 | 9/2018 | Roth et al. | |
| 2018/0341835 A1 | 11/2018 | Siminoff | |
| 2019/0347916 A1 | 11/2019 | Wild et al. | |

OTHER PUBLICATIONS

International Preliminary Report on Patentability in International Appln. No. PCT/US2018/035584, mailed Dec. 12, 2019, 8 pages.
International Search Report and Written Opinion in International Appln. No. PCT/US2018/035584, mailed Aug. 23, 2018, 13 pages.

* cited by examiner

CONTROL ACCESS UTILIZING VIDEO ANALYTICS

CROSS REFERENCE TO RELATED APPLICATIONS

This application is a continuation of U.S. application Ser. No. 15/995,596, filed Jun. 1, 2018, which claims benefit of U.S. Provisional Application No. 62/513,588, filed Jun. 1, 2017. The disclosure of each of the foregoing applications is incorporated herein by reference.

TECHNICAL FIELD

This disclosure relates to property monitoring technology and, for example, utilizing video analytics and passive infrared (PIR) technology to detect visitors at the front door of the monitored property.

BACKGROUND

Many people equip homes and businesses with monitoring systems to provide increased security for their homes and businesses.

SUMMARY

Techniques are described for monitoring technology. For example, techniques are described for integrating a monitoring system with a touchless doorbell device that includes a camera that utilizes video analytics combined with PIR technology to detect a visitor at the monitored property. The automated process of detecting the presence of a visitor at the door of the monitored property eliminates the need for a physical doorbell.

According to an innovative aspect of the subject matter described in this application, a monitoring system that is configured to monitor a property, the monitoring system includes a touchless doorbell device that includes a camera and a motion sensor and that is configured to detect, motion in a vicinity of the touchless doorbell device using the motion sensor, capture an image using the camera based on detecting motion in a vicinity of the touchless doorbell device, based on capturing the image, transmit the image to a monitor control unit. The monitor control unit that is configured to receive the image from the touchless doorbell device, analyze the image, determine that the image likely includes a representation of a person based on analyzing the image, and perform a monitoring system action based on determining that the image likely includes a representation of a person. These and other implementations each optionally include one or more of the following optional features. The monitor control unit is configured to perform a monitoring system action by providing, for output to a client device of a resident of the property, a notification indicating that a person is likely at the monitored property. The notification indicating that a person is likely at the monitored property includes at least one of the one or more captured images of the person, and a control to indicate that the person is allowed to access the property. The monitor control unit is configured to receive, from the client device of the resident of the property, data indicating a selection of the control indicating that the person is allowed to access the property, and in response to receiving data indicating the selection of the control indicating that the person is allowed to access the property, granting the person access to the property.

The monitor control unit is configured to determine that the image likely includes a representation of a person by determining a confidence score that reflects a likelihood that the image includes a representation of a person, comparing the confidence score that reflects the likelihood that the image includes a representation of a person to a confidence score threshold, and based on comparing the confidence score that reflects the likelihood that the image includes a representation of a person to the confidence score threshold, determining that the confidence score that reflects the likelihood that the image includes a representation of a person satisfies the confidence score threshold. The monitor control unit is configured to compare the received image to one or more stored images of one or more known persons, determine a score that reflects a likelihood that the received image is an image of a known person based on comparing the received image to the one or more stored images of one or more known persons, compare the score that reflects a likelihood that the received image is an image of a known person to a threshold, and based on comparing the score that reflects a likelihood that the received image is an image of a known person to a threshold, determining that the score that reflects a likelihood that the received image is an image of a known person satisfies the threshold.

The monitor control unit is configured to determine the monitoring system is in an armed state, and perform an action by automatically disarming the monitoring system, and unlocking a front door to the monitored property. The touchless doorbell device is configured to receive, from the monitor control unit, data indicating that the score that reflects a likelihood that the received image is an image of a known person satisfies the threshold, and based on receiving, from the monitor control unit, data indicating that the score that reflects a likelihood that the received image is an image of a known person satisfies the threshold, outputting, by a speaker of the touchless doorbell device, a prerecorded message that is specific to an identify of the known person in the received image. The monitor control unit is configured to receive, from the user, one or more user preferences that identifies a specific chime for each of the one or more known persons, determine, an identity of the known person in the received image, determine, a chime that matches the identity of the known person in the received image, and the touchless doorbell device is configured to output, by the speaker to an inside of the property, the chime that matches the identity of the known person in the received image.

The monitor control unit is configured to compare the received image to one or more stored images of one or more known persons, based on comparing the received image to the one or more stored images of one or more known persons, determine a score that reflects a likelihood that the received image is an image of a known person, compare the score that reflects a likelihood that the received image is an image of a known person to a threshold, and based on comparing the score that reflects a likelihood that the received image is an image of a known person to a threshold, determining that the score that reflects a likelihood that the received image is an image of a known person does not satisfy the threshold, determine the monitoring system is in an unarmed state, and perform an action by automatically arming the monitoring system, and performing one or more actions that simulate occupancy the property. The monitor control unit is configured to determine, based on the analyzing the image, that a face portion of the representation of a person is obstructed, based on determining that the face portion of the representation of a person is obstructed, providing, for output by the speaker of the touchless doorbell device, an audio message informing the person to remove any obstructions, receive, at a second later time, from the touchless doorbell device, a second image, determine, based on analyzing the second image, that a face portion of the representation of a person is obstructed, and based on determining that the face portion of the representation of a person is obstructed, locking the front door and sounding an alarm.

The monitor control unit is configured to determine, based on analyzing the image, a duress score that reflects a likelihood that the person in the image is under duress, compare the duress score that reflects a likelihood that the person in the image is under duress to a duress score threshold, based on comparing the duress score that reflects a likelihood that the person in the image is under duress to a duress score threshold, determining that the duress score satisfies the duress score threshold, and based on determining that the duress score exceeds the duress score threshold, sounding an alarm.

The monitor control unit is configured to determine, based on analyzing the image, that the image likely includes a representation of a package, and based on determining that the image likely includes a representation of a package, outputting, by a speaker of the touchless doorbell device, a prerecorded message that indicates to place the package at a front door, and providing, for output to a client device of a resident of the property, a notification indicating that a package is likely delivered to the property.

According to another innovative aspect of the subject matter described in this application, a computer implemented method includes receiving, by a monitoring system that is configured to monitor a property and from a touchless doorbell device that includes a camera and a motion sensor, an image, analyzing, by the monitoring system, the image, based on analyzing the image, determining that the image likely includes a representation of a person, and based on determining that the image likely includes a representation of a person, performing a monitoring system action.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for integrating a monitoring system with a touchless doorbell device that utilizes video analytics combined with PIR technology to detect visitors at a front door of a monitored property. The touchless doorbell device is a device that includes a camera, one or more sensors, a speaker, a microphone, and a cable, e.g., that can facilitate a two-way audio/video communication. The touchless doorbell device may be mounted to an exterior wall of the monitored property approximate to the front door entrance way, and the camera of the device is configured to have a wide field of view to easily detect visitors as they approach the front door. The camera of the touchless doorbell device includes a Passive Infrared Sensor (PIR), that is configured to detect heat radiated from objects to detect movement of a living organism within the field of view of the sensor and camera lens. When the PIR sensor detects movement, the camera initiates the capture of video data which is then communicated to a control unit within the monitoring system. The control unit then automatically notifies a user associated with the monitoring property of the arrival of the visitor thereby eliminating the need for a physical doorbell at the property.

Figure 1A:
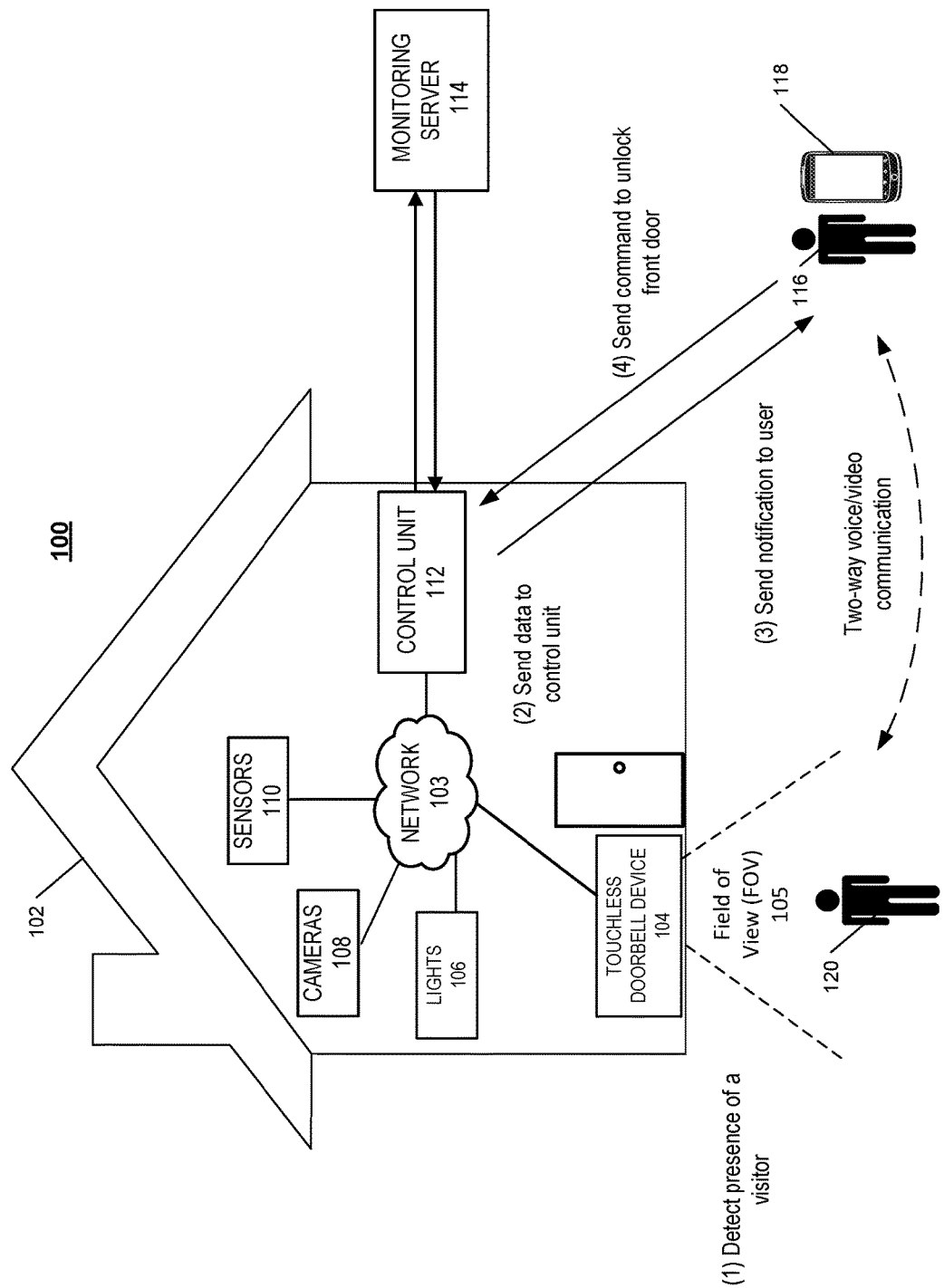
FIGS. 1A and 1B illustrate examples of a system for utilizing video analytics and sensor technology to detect visitors at a monitored property.

FIG. 1A illustrates an example of a monitoring system 100 integrated with a touchless doorbell device 104. As shown in FIG. 1A, a property 102 (e.g. a home) of a user 116 is monitored by an in-home monitoring system (e.g. in-home security system) that includes components that are fixed within the property 102. The in-home monitoring system may include a control unit 112, one or more sensors 110, one or more cameras 108, one or more lights 106, and a touchless doorbell device 104. The user 116 may integrate the touchless doorbell device 104 into the in-home monitoring system to monitor for visitors/guests arriving at the monitored property thereby eliminating the need for a physical doorbell.

In the example shown in FIG. 1, a visitor 120 may approach the monitored property 102. When the visitor is within the field of view (FOV) 105 of the camera of the touchless doorbell device 104, the PIR sensor within the camera may detect the heat radiated off the visitor 120 to detect movement within the FOV 105. When the presence of the visitor 120 is detected within the FOV 105 of the touchless doorbell device 104, the touchless doorbell device 104 initiates the capture of video and/or image data. The touchless doorbell device 104 may immediately communicate the capture video and/or image data to the control unit 112 within the monitored property 102. In some examples, the touchless doorbell device may include one or more cameras that are configured to ensure that anyone approaches the monitored property 102 is captured in the FOV of at least one camera. In some examples, a touchless doorbell device may be mounted to the backdoor entrance, and the garage door entrance of the monitored property 102.

The control unit 112 notifies the user 116 to the arrival of the visitor 120. In some implementations, the control unit 112 may send a message through a monitoring application that runs on the user device 118. The message may include the video and/or image data captured by the touchless doorbell device 104. The user 116 may review the received video and/or image data received, and based on the identity of the visitor 120, the user may decide unlock the front door. For example, the user 116 may respond to the received notification commanding the control unit 112 to unlock the front door.

The control unit 112 may receive the command from the user 116, and may then communicate with a connected door knob or door hinge device to unlock and open the front door of the monitored property 102. A connected door knob device is a device that is configured to lock or unlock a door within the monitored property based on a lock or unlock command received from the control unit 112. A connected door hinge device is a device that is configured to open or close a door within the monitored property based on an open or close command received from the control unit 112. In some examples, the control unit 112 may prompt the speaker of the touchless doorbell device 104 to output a message to the visitor 120 notifying the visitor 120 that the front door is unlocked and opened. Based on the use of video analytics and the PIR sensor, the monitoring system may detect visitors, notify the user 116, and open the front door thereby eliminating the need for a physical doorbell at the monitored property 102.

When the touchless doorbell device 104 detects the presence of a visitor 120, the device may immediately send a notification alert to the control unit 112, which in turn immediately sends a notification to the user device 118 of the user 116. Based on receiving a notification of a visitor at the property 102, the user 116 may choose to initiate a two-way voice/audio session to communicate with the visitor 120. The touchless doorbell device 104 may be configured to enable two-way voice/audio communication with the user 116. The user 116 may identify the visitor through the video communication, and may instruct the visitor on how to proceed. In some implementations, when the touchless doorbell device 104 detects the presence of a visitor and communicates the notification to the control unit 112, the touchless doorbell device 104 may then output a pre-recorded message to the visitor. For example, the pre-recorded message may indicate that the user 116 may be at the door shortly. In some examples, the pre-recorded message that is output by the speaker is selected from one or more messages, and may be based on the current armed status of the monitoring system. For example, when the monitoring system is armed away, the pre-recorded message may indicate that no one is currently at the monitored property, and when the monitoring system is armed stayed, the pre-recorded message may indicate that someone will be at the door shortly.

In some implementations, when the touchless doorbell device 104 detects the presence of a visitor 120 at the front door, a speaker within the property generates an audible chiming sound to mimic the sound of a typical doorbell within the monitored property 102. In these implementations, the user 116 may have the ability to customize the sound generated by the speaker through the use of the monitoring application on the user device 118. The user 116 may select an appropriate volume of the sound produced, and may select the sound that is produced by choosing from a variety of sound options available through the monitoring application. In some examples, the user may select a song to be used as the audible output. In some implementations, the user 116 may select a pre-recorded message to be generated when the touchless doorbell device 104 detects the presence of a visitor. For example, the speaker may output a pre-recorded message of "There is a visitor at the front door," based on detecting the presence of a visitor.

The touchless doorbell device 104 may use facial recognition software to identify visitors. Images of visitors whose identity was previous confirmed by the user 116 may be stored in memory at the control unit 112. When a known visitor arrives at the property 102, the control unit 112 may identify the visitor as known, and may send a notification to the user 116 indicating that a known visitor is at the door. In some examples, the user 116 may have the ability to set pre-recorded greetings and audible "doorbell" tones that are specific to one or more different visitors. For example, when the user's mother arrives at the property 102, the pre-recording may be "Mum, come on in," and the chime may be song special to the user 116. When an unknown visitor arrives at the property 102, the speaker of the touchless doorbell device may output a pre-recorded message that notifies the visitor that they are being recorded. In some examples, when the user 116 receives video/image data of the visitor 120, and is unable to identify the visitor, the user may command the control unit 112 to generate an alarm event if the visitor does not identify themselves and the reason for visiting the property 102.

In some implementations, when the touchless doorbell device 104 detects the presence of a visitor, one or more other connected devices at the property 102 are activated. The control unit 112 may determine which of the one or more connected devices are activated based on the time of day and/or the identity of the visitor. For example, when the touchless doorbell device 104 detects a visitor at the door after sun down, one or more lights 106 on located at the front exterior of the property 102 may be switched on. In another example, when the touchless doorbell device 104 detects a visitor whose identity is unknown, the control unit 112 may command one or more interior light to switch on, and may prompt a speaker to output a pre-recorded sound of a dog barking in efforts to deter a potential intruder.

Figure 1B:
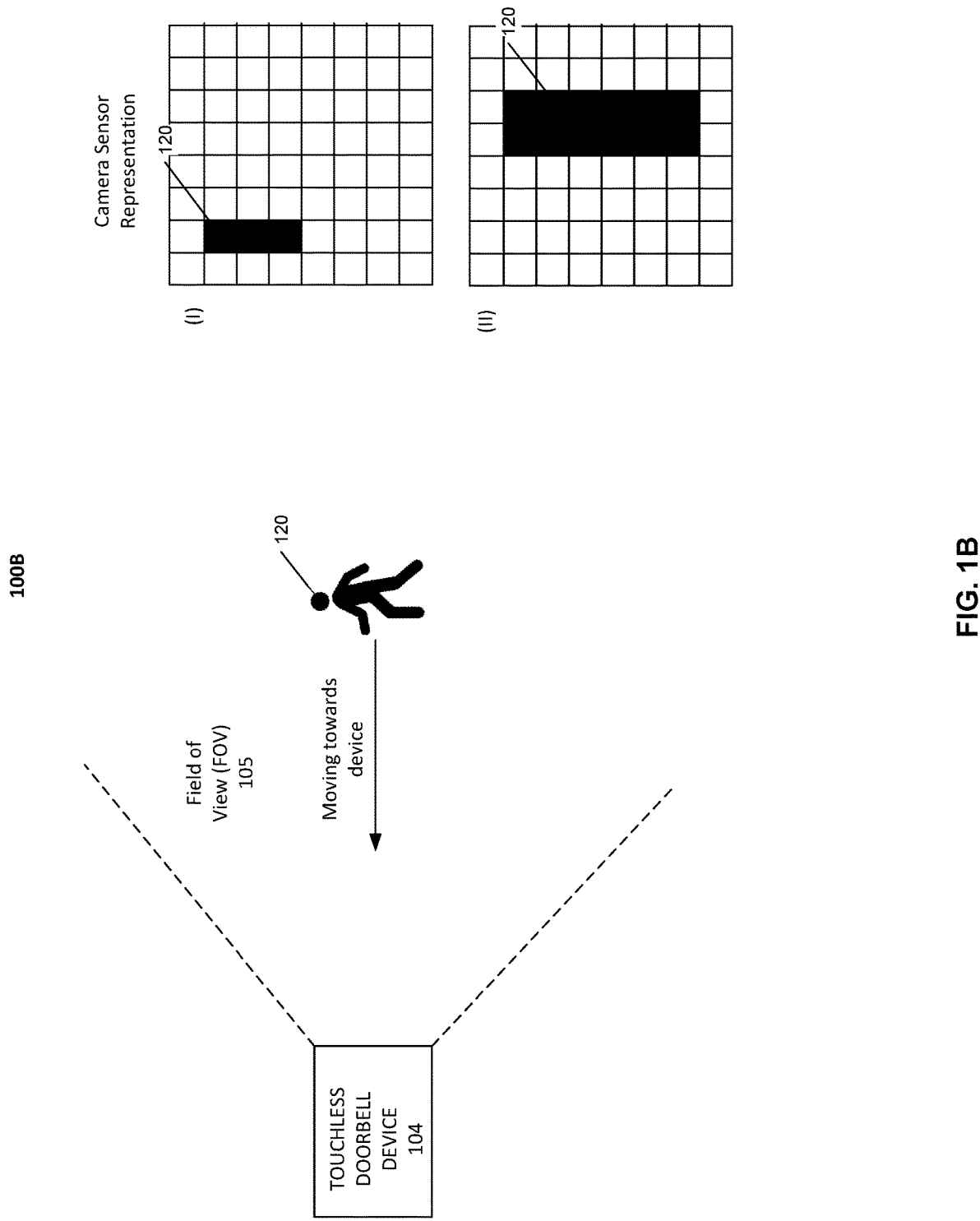

In some implementations, the touchless doorbell device 104 may include a low power light sensitive sensor. The low power light sensor may be configured to collimate light such that an adequate number of regions of the field of view are collimated onto a sufficient number of regions on the sensor, and may be configured to assess the amount of light striking the different regions of the sensor. In visual conditions other than total darkness, objects moving within the field of view 105 of the camera of the touchless doorbell device 104 may cause changes in the amount of light reaching the light sensitive sensor, and based on the variations in the light intensity, the touchless doorbell device 104 may determine when an object is moving. As illustrated in FIG. 1B, the light sensitive sensor within the touchless doorbell device 104 may determine whether an object in its field of view is increasing in size, indicating the object is moving toward the device 104, or may determine whether the object is decreasing in size, indicating the object is moving away from the device 104. The touchless doorbell device 104 may be configured to determine the shape of the detected object and may determine whether the object is a human or animal based on the determined shape.

As depicted in FIG. 1B, in the camera sensor representation, at a first moment in time (I), the object, in this case the visitor 120 is smaller than at the second moment in time (II), that is, the visitor 120 is increasing in size within the field of view of the touchless doorbell device 104. The light sensitive sensor in the device 104 may also be configured to distinguish between a human form and an animal form. Based on the configuration of the light striking the light sensitive sensor, the sensor determines the object is of human form. Based on confirming the object in the FOV 105 of the touchless doorbell device 104, the device 104 may initiate capturing video and/or image data of the visitor 120. In examples where the touchless doorbell device 104 determines the object in the FOV 105 is an animal form, the device 104 may not initiate the capturing of video and/or image data since the object is likely not a visitor. For example, a stray cat may walk up to the monitored property 102, and the device 104 will not start capturing data based on the light sensitive sensor indicating the object in the FOV is an animal form and is therefore not a visitor. The light sensitive sensor may also determine when someone is within the FOV 105 of the touchless doorbell device 104 but is merely walking by the monitored property 102. When the detected human form traverses the screen of the sensor this indicates that the person is walking by and is not approaching the front door.

Figure 2:
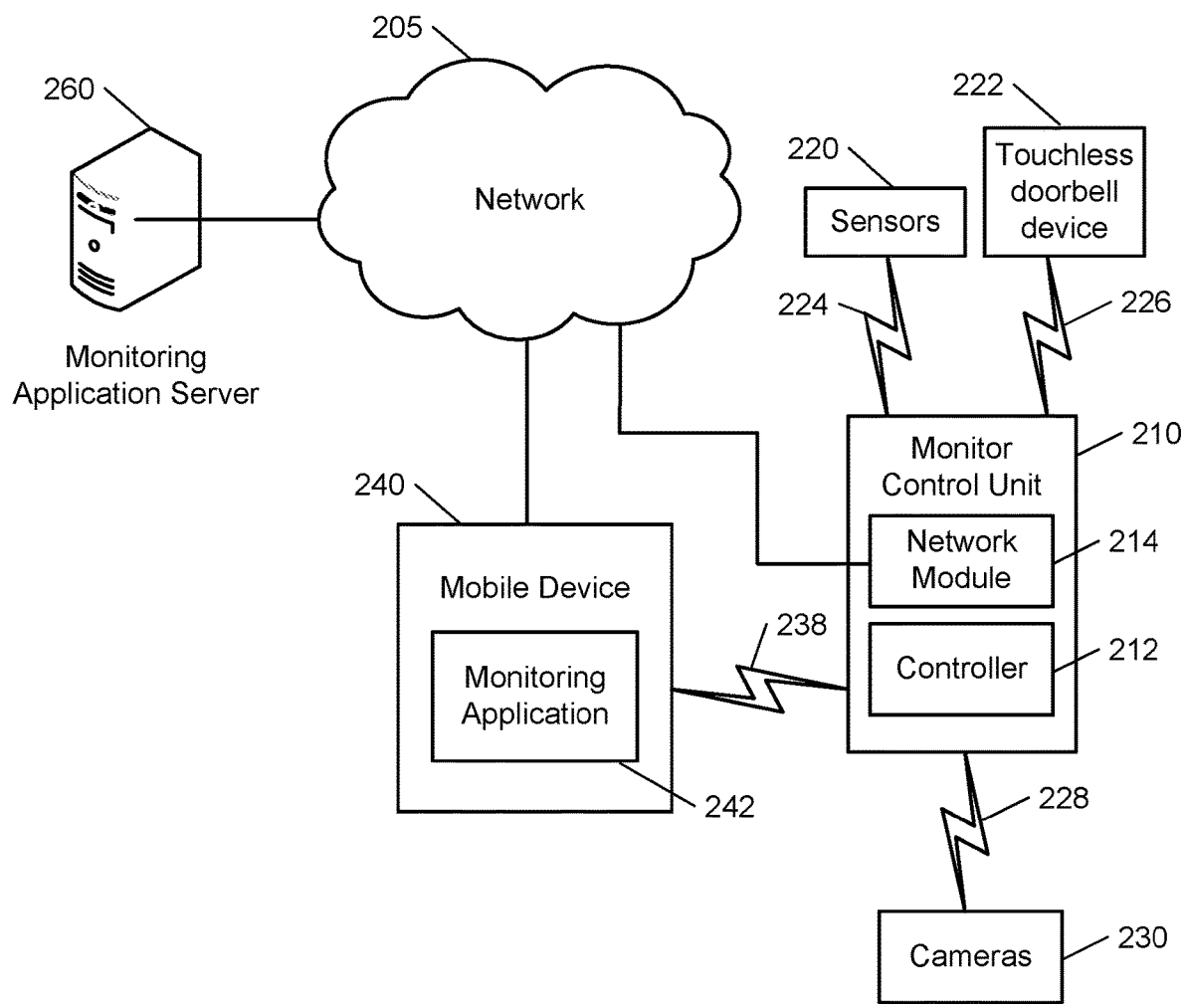
FIG. 2 illustrates an example of a monitoring system integrated with a touchless doorbell device.

FIG. 2 illustrates an example of a system 200 configured to monitor a property. The system 200 includes a network 205, a monitoring system control unit 210, one or more user devices 240, and a monitoring application server 260. The network 205 facilitates communications between the monitoring system control unit 210, the one or more user devices 240, and the monitoring application server 260. The network 205 is configured to enable exchange of electronic communications between devices connected to the network 205. For example, the network 205 may be configured to enable exchange of electronic communications between the monitoring system control unit 210, the one or more user devices 240, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from indoor door knobs, sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The monitoring system may include a touchless doorbell device 222. The touchless doorbell device 222 may include a PIR sensor, a light sensitive sensor, a speaker, and a camera. The monitoring system may also include one or more other cameras 230. Each of the camera or the touchless doorbell device 222 and the one or more cameras 230 may be video/photographic cameras or other type of optical sensing device configured to capture images. For instance, the cameras may be configured to capture images of an area within a building monitored by the monitor control unit 210. The cameras may be configured to capture single, static images of the area and also video images of the area in which multiple images of the area are captured at a relatively high frequency (e.g., thirty images per second). The cameras may be controlled based on commands received from the monitor control unit 210.

The cameras may be triggered by several different types of techniques. For instance, a Passive Infra Red (PIR) motion sensor may be built into the cameras and used to trigger the one or more cameras 230 to capture one or more images when motion is detected. The one or more cameras 230 also may include a microwave motion sensor built into the camera and used to trigger the camera to capture one or more images when motion is detected. Each of the one or more cameras 230 may have a "normally open" or "normally closed" digital input that can trigger capture of one or more images when external sensors (e.g., the sensors 220, PIR, door/window, etc.) detect motion or other events. In some implementations, at least one camera 230 receives a command to capture an image when external devices detect motion or another potential alarm event. The camera may receive the command from the controller 212 or directly from one of the sensors 220.

In some examples, the one or more cameras 230 triggers integrated or external illuminators (e.g., Infra Red, Z-wave controlled "white" lights, lights controlled by the module 214, etc.) to improve image quality when the scene is dark. An integrated or separate light sensor may be used to determine if illumination is desired and may result in increased image quality.

The sensors 220, the touchless doorbell device 222, and the cameras 230 communicate with the controller 212 over communication links 224, 226, and 228. The communication links 224, 226, and 228 may be a wired or wireless data pathway configured to transmit signals from the sensors 220, the touchless doorbell device 222, and the cameras 230 to the controller 212. The communication link 224, 226, and 228 228 may include a local network, such as, 802.11 "Wi-Fi" wireless Ethernet (e.g., using low-power Wi-Fi chipsets), Z-Wave, Zigbee, Bluetooth, "HomePlug" or other Powerline networks that operate over AC wiring, and a Category 5 (CAT5) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a monitoring application 242. The monitoring application 242 refers to a software/firmware program running on the corresponding mobile device that enables the user interface and features described throughout. The user device 240 may load or install the monitoring application 242 based on data received over a network or data received from local media. The monitoring application 242 runs on mobile devices platforms, such as iPhone, iPod touch, Blackberry, Google Android, Windows Mobile, etc. The monitoring application 242 enables the user device 140 to receive and process image and sensor data from the monitoring system.

The central alarm station server 270 is an electronic device configured to provide alarm monitoring service by exchanging communications with the monitor control unit 210, the one or more user devices 240, and the monitoring application server 260 over the network 205. For example, the central alarm station server 270 may be configured to monitor alarm events generated by the monitoring system control unit 210. In this example, the central alarm station server 270 may exchange communications with the network module 214 included in the monitor control unit 210 to receive information regarding alarm events detected by the monitor control unit 210. The central alarm station server 270 also may receive information regarding alarm events from the one or more user devices 240.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as Wi-Fi, Bluetooth, Z-Wave, Zigbee, "HomePlug," or other Powerline networks that operate over AC wiring, or Power over Ethernet (POE), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitoring system control unit 210 and perform the functions of the monitoring system control unit 210 for local monitoring and long range/offsite communication. Other arrangements and distribution of processing is possible and contemplated within the present disclosure.

Figure 3:
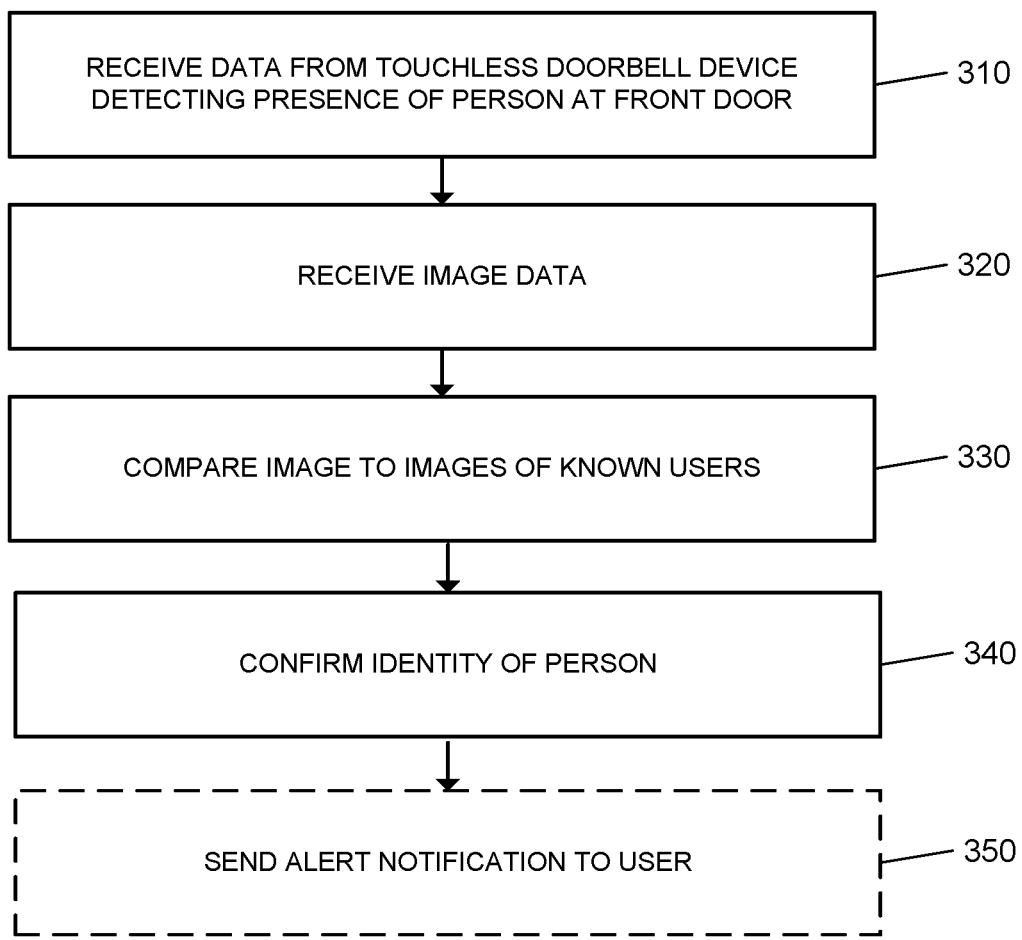
FIG. 3 is a flow chart of an example process for sending an alert notification to a user.

FIG. 3 illustrates an example process 300 for sending a notification to a user. The control unit 112 receives data from the touchless doorbell device 104 detecting the presence of a person at the front door at the monitored property 102 (310). The PIR sensor of the touchless doorbell device 104 detects the heat radiated off objects to detect movement of a living organism within the FOV 105 of the camera lens of the touchless doorbell device 104. In some examples, the touchless doorbell device 104 may include one or more cameras that are arranged to detect movement at the front door from one or more different angles. Including one or more cameras that may detect movement from the one or more different angles ensures that the touchless doorbell device 104 detects any possible motion near the front door of the monitored property 102.

In some implementations, the touchless doorbell device 104 may include a light sensitive sensor. The light sensitive sensor may be a low power sensor that is configured to collimate light to assess the amount of light that strikes the different regions of the sensor. The light sensitive sensor detects objects moving within the FOV 105 of the touchless doorbell device 104 in visual conditions other than in total darkness. The light sensitive sensor is configured to determine whether an object within the FOV 105 is increasing in size, indicating the object is moving toward the touchless doorbell device 104, or may determine whether the object is decreasing in size, indicating the object is moving away from the touchless doorbell device 104. The light sensitive sensor can also distinguish between a human form object and an animal form object in the FOV 105 of the touchless doorbell device 104. The PIR sensor along with the light sensitive sensor detect the presence of a person at the front door of the property based on detecting motion within the FOV and detecting the object causing the motion is moving towards the touchless doorbell device and is of a human form. The sensor data is communicated from the touchless doorbell device 104 to the control unit 112 at the monitored property 102.

The control unit 112 receives image data from the touchless doorbell device 104 (320). The touchless doorbell device 104 is prompted to initialize the capture of video and/or image data when motion is detected in the FOV 105 of the device 104. The touchless doorbell device may capture several still images of the person at the front door. In some examples, the touchless doorbell device 104 may be a pan and tilt camera that is configured to pan and tilt its position to capture images of the person at the front door. The captured image and/or video data is communicated over the network 103 to the control unit 112. The control unit 112 may command one or more external lights near the front door of the monitored property to switch on, based on the control unit 112 receiving poor quality images. The control unit 112 may switch on the one or more lights and capture several more images of the person at the front door.

In examples where the person is wearing a mask or some other object that blocks the person's face, the touchless doorbell device 104 outputs a pre-recorded message that notifies the person to immediately remove the mask, that they are being recorded, and failure to remove the mask will result in altering the authorities.

The control unit 112 compares the received images to stored images of one or more known users (330). The user 116 may log into the monitoring application on the user device 118 and may provide a list of preferred visitors and their image. For example, the user may include an image of his mother, father, best friend, nanny, and dog walker, along with the corresponding images. The preferred visitors and associated image data may be stored at a backend monitoring server 114, that manages the monitoring application and that is in communication with the control unit 112. As seen in FIG. 1A, the monitoring server 114 may be located remotely to the monitored property 102, and may be in communication with the control unit 112. The monitoring server 114 may communicate the images of the preferred visitors to the control unit 112 for comparison. In some implementations, the control unit 112 communicates the captured images of the visitor to the monitoring server 114, and the monitoring server 114 uses facial recognition software to identify the visitor.

In some implementations, the control unit 112 may store the captured images of visitors that visited the monitored property 102 in the past. For example, when a visitor approaches the property, the control unit 112 communicates a notification to the user, and the user initiates a two-way audio call with the visitor to confirm the visitor's identity. The control unit 112 may store the images of the confirmed visitors in memory for comparative use in the future.

The control unit 112 confirms the identity of the person at the front door (340). The control unit 112 may utilize facial recognition software to identify matches in the captured images and the stored images of known users. In some examples, the monitoring server 114 may perform the comparison of the images. When the control unit 112 confirms the person at the front door is a known visitor, the touchless doorbell device 104 may generate an audible chiming sound to mimic the sound of a typical doorbell within the monitored property 104. In some implementations, the user 116 may associate preferred visitors with a set specific chiming sound. For example, the user 116 may associate a special chime for his mother and a different chime for his best friend. The touchless doorbell device 104 may output a pre-recorded message when the person at the front door is a known visitor. The user 116 may assign pre-recorded messages for each of the one or more preferred users through the monitoring application.

The user 116 may associate a list of actions to be performed once the identity of the person is confirmed to be a known visitor. The user 116 may associate the preferred actions with each of the one or more preferred visitors. For example, the user 116 may wish for the front door to automatically unlock when the dog walker arrives at the monitored property 102. In these examples, when the control unit 112 confirms the person at the front door is the dog walker, the control unit 112 commands monitoring system to disarm, and the connected door knob device on the front door to unlock the front door so the dog walker may enter. The user 116 may have the ability to set time schedules to the list of actions to prohibit the dog walker from arriving at the property at 5:00 AM and gaining access to the property. The user 116 may update and change the times and list of actions as often as desired through the monitoring application on his mobile device 118.

The control unit 112 sends an alert notification to the user 116 (350). The notification may be sent as an in-app message through the monitoring application to the user device 118. In some examples, the notification may include a captured image of the person and the time of their arrival. The notification may include an option to initiate a two-way audio or video call with the visitor. In some implementations, the user 116 may have the ability to respond to the notification and include one or more actions the control unit 112 may implement. For example, the user 116 may respond commanding the control unit 112 to unlock the front door to allow the person to enter the property 102. When the control unit 112 confirms that the person at the front door is either the user 116, or another user that resides at the monitored property 102, the control unit 112 will not send a notification to the mobile device 118 of the user 116.

In some implementations, the control unit 112 may be configured to use the facial expressions of the user 116 to assess a level of duress when the user 116 approaches the touchless doorbell 104 with an unknown person. For example, the user 116 may be a victim of a burglary where the burglar is holding the user under duress to gain access to the monitored property 102. When the user 116 approaches the touchless doorbell device, but is in the presence of the unknown person (the burglar), the control unit 112 may use the image and video data received to assess the level of duress in the facial expressions of the user 116. When the control unit 112 determines that the level of duress of the user 116 is beyond a threshold, the control unit 112 may communicate with the monitoring server 114 to alert the authorities. In some examples, the control unit 112 may communicate the received images of the user 116 and the unknown person to the monitoring server 114 which may in turn submit the images to the authorities. In some examples, the control unit 112 may prompt the monitoring system at the property to sound an audible alarm to attempt to deter the burglar.

In other implementations, the control unit 112 may be configured to identify "alarm expressions." The user 116 may set user preferences through the monitoring application that includes an expression that may be used by the user 116 when the authorities should be contacted. For example, the user 116 may have been followed home by a burglar who is attempting to force himself into the property 102, when the user 116 approaches the touchless doorbell device 104, the user 116 may pull on his ear to signal the control unit 112 to contact the authorities.

Figure 5:
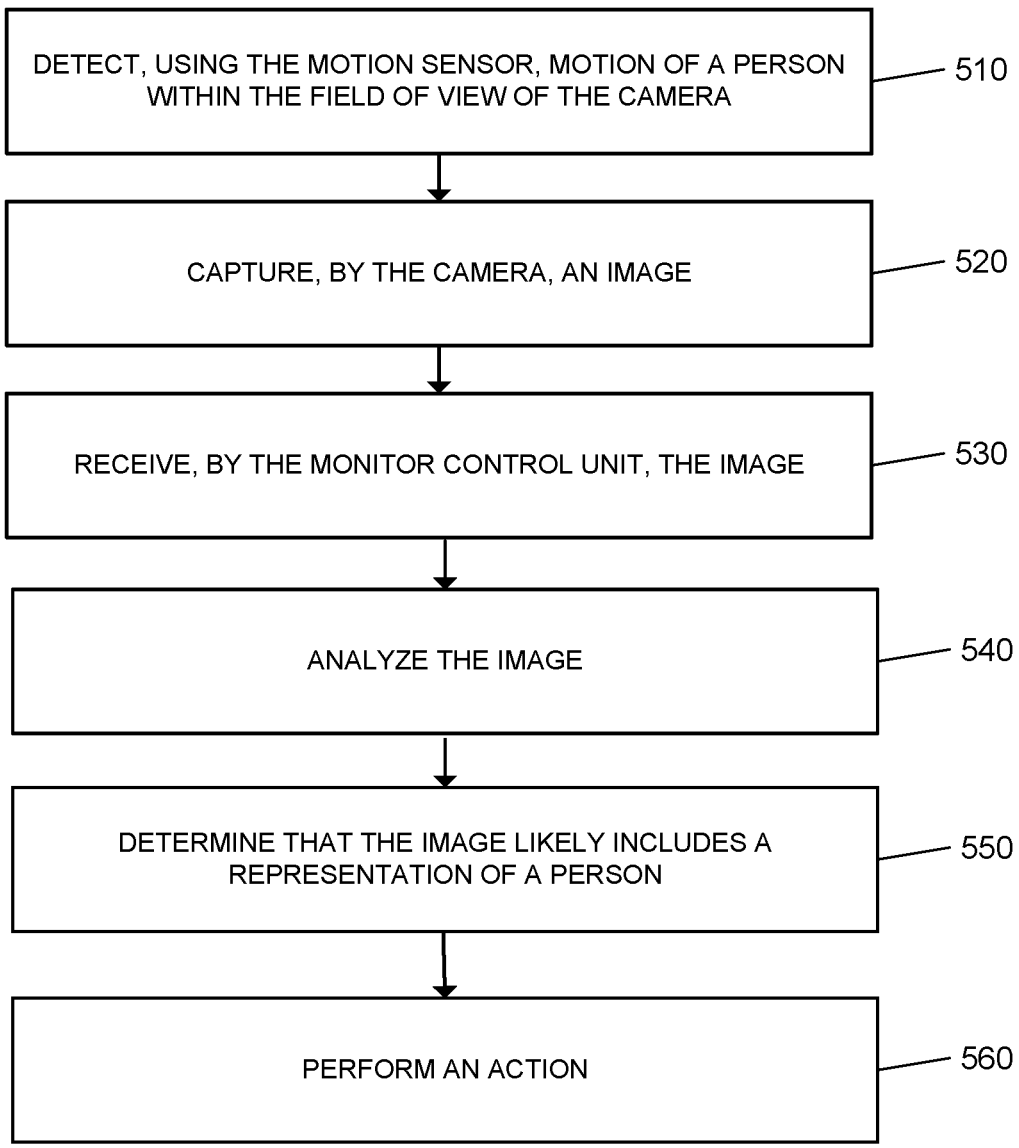
FIG. 5 is a flow chart of an example process for performing a monitoring system action.

FIG. 5 illustrates an example of a monitoring system integrated with a touchless doorbell device 104, where the system may determine not to send a visitor notification to the user 116. As described with reference to FIG. 1A, a property 102 (e.g. a home) of a user 116 is monitored by an in-home monitoring system (e.g. in-home security system) that includes components that are fixed within the property 102. The in-home monitoring system may include a control unit 112, one or more sensors 110, one or more cameras 108, one or more lights 106, and a touchless doorbell device 104. The control unit 112 may use the data received from the touchless doorbell device 104 to determine whether or not to send a notification to the user 116. The control unit 112 may not send a notification to the user 116 when the control unit confirms the visitor is a delivery man 302.

Figure 4:
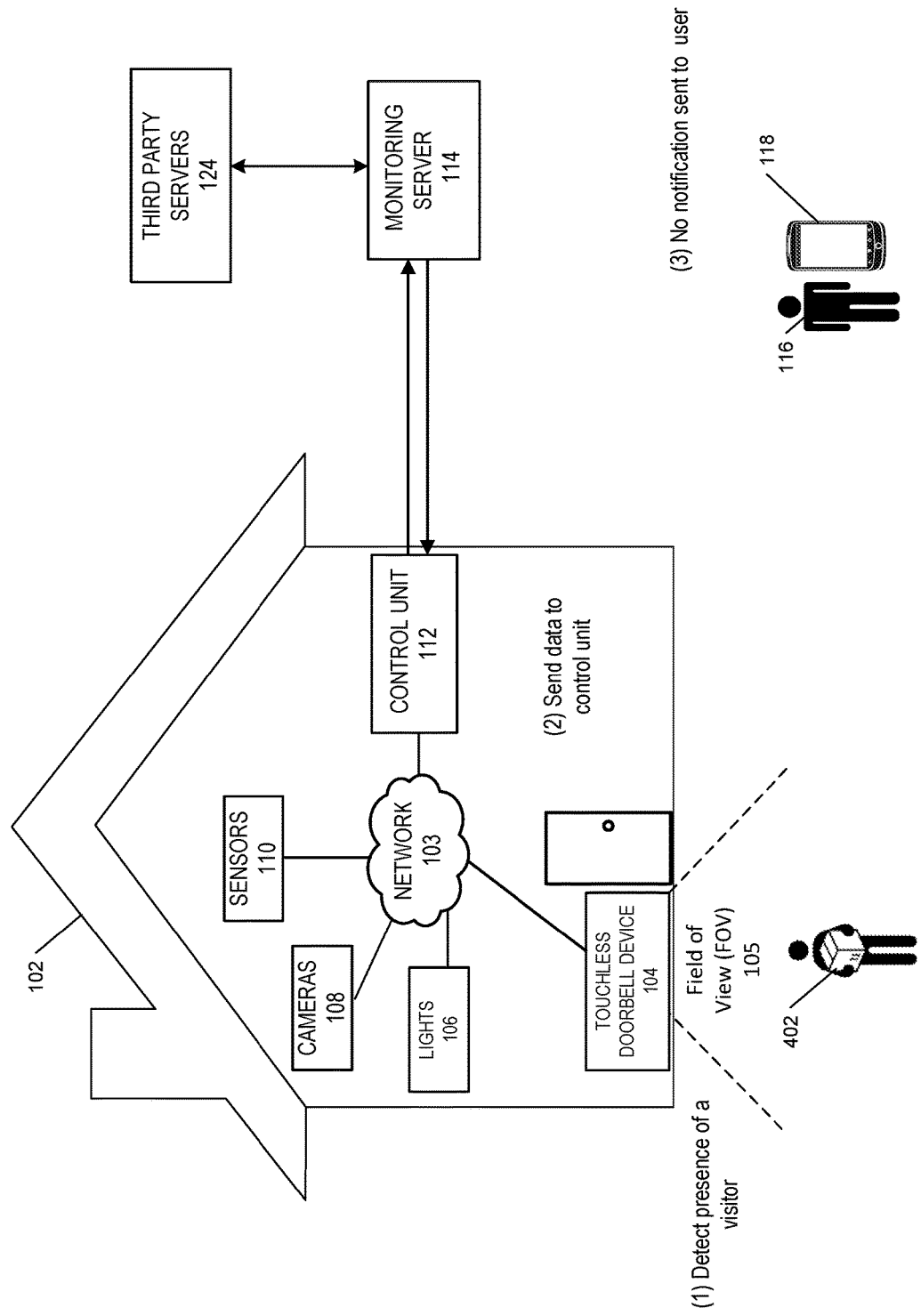
FIG. 4 illustrates an example of a system for determining when to send a notification to the user.

As depicted in FIG. 4, the delivery man 402 approaches the monitored property 102. When the delivery man 402 is within the field of view (FOV) 105 of the camera of the touchless doorbell device 104, the PIR sensor within the camera may detect the heat radiated off the delivery man 402 to detect movement within the FOV 105. When the presence of the delivery man 402 is detected within the FOV 105 of the touchless doorbell device 104, the device 104 initiates the capture of video and/or image data. The camera of the touchless doorbell device 104 may pan and/or tilt to capture the video and/or image data of the delivery man 402. The control unit 112 receives the video and/or image data from the camera of the touchless doorbell device 104, and determines the delivery man 402 is not a known visitor.

Based in the control unit 112 determining that the delivery man 402 is not a known visitor, the control unit 112 continues to capture video and image data of the delivery man 402. The camera of the touchless doorbell device 104 may use different analytics such as, object recognition, shape recognition, etc., to identify the package, identify any logos associated with the delivery man 402. The camera of the touchless door bell device may be configured to perform analytics on other parts of the captured images to identify other items in the frame. For example, the camera may identify a delivery truck parked in front of the property. The data analytics may be communicated to the control unit 112, and in turn communicated to the monitoring server 114 to be compared against a shared database of data to confirm the visitor is indeed a UPS delivery man. Based on confirming the visitor as a delivery man 402, the control unit may not send a notification to the user 116 to notify the user of a visitor. In some examples, the control unit may send a notification to the user 116 to notify the user that a delivery man was at the property. In examples where the control unit receives package information from the monitoring server, the notification may include details of the sender of the package and the package delivery time.

The monitoring server 114 may manage the monitoring application, and may be in communication with one or more other control units from other monitored properties. In some implementations, when the identity of the delivery man 402 is not confirmed as a known visitor, the control unit 112 may communicate the received image and video data to the monitoring server 114. The monitoring server 114 may receive data from third party servers 124. The third party servers 124 may be servers of shipping companies such as UPS, FedEx, and US Postal Service. The third party servers 124 may also include servers of merchant websites such as Amazon, Groupon, WayFair etc. The monitoring server 114 may access the data received from the third party servers 124 to confirm the visitor is a delivery man, based on the received images including images of the delivery man 402 with one or more packages, the man wearing a company issued uniform with a company logo, and based on information that confirms a package was shipped by a shipping company from one of the merchant websites.

For example, the user 116 may have ordered an item from Amazon that was shipped via UPS. The third party servers from both Amazon and UPS would communicate the order information along with the tracking information of the package to the monitoring server 114. The monitoring server 114 may confirm a package delivery was expected on the given day based on the information received from the third party servers 124, and may confirm based on the video analytics that indicate a delivery man was wearing a UPS uniform and was holding a package arrived at the monitored property. The monitoring server 114 confirms the delivery man 402 is the expected UPS delivery man and communicates the confirmation to the control unit 112. In turn, the control unit does not send a notification alert to the user 116 to notify of the visitor, since the delivery man 402 is likely just dropping off a package. In some examples, when the control unit confirms the visitor 402 is a delivery man, the control unit prompts the speaker of the touchless doorbell device 104 to output a pre-recorded message to leave the package on the door step.

FIG. 5 illustrates an example process 500 for performing an action. A monitoring system at a monitored property may be controlled by a monitor control unit. The monitoring system may be integrated with one or more sensors, one or more lights, one or more cameras, and a touchless doorbell device. The touchless doorbell device includes a camera, one or more sensors, a speaker, and a microphone. The touchless doorbell device may be capable of facilitating two-way audio/video communication. The motion sensor of the touchless doorbell device detects motion in a vicinity of the touchless doorbell device (510). For example, the motion sensor detects motion when an object moves within a four feet radius from the touchless doorbell device. In some implementations, the PIR sensor of the camera of the touchless doorbell device detects motion of a person within the field of view (FOV) of the camera (510). The touchless doorbell device may be mounted to an exterior wall of the monitored property near to the front door entryway. The camera of the touchless doorbell device includes a Passive Infrared Sensor (PIR) that is configured to detect heat radiated from objects to detect movement of a living organism within the field of view of the sensor and camera lens. For example, the PIR sensor detects heat radiated off a person as the person approaches the front door of the monitored property. In these implementations, the touchless doorbell device may detect heat off an object and determine to capture one or more images of the object within the field of view of the camera of the touchless doorbell device.

In some implementations, the camera of the touchless doorbell device may include a light sensitive sensor. The light sensitive sensor may be a low power sensor that is configured to collimate light to assess the amount of light that strikes the different regions of the sensor. The light sensitive sensor is configured to detect objects moving within the field of view of the camera of the touchless doorbell device in visual conditions other than in total darkness. The camera of the touchless doorbell device is configured to capture one or more images of the object moving within the field of view. The camera communicates the one or more images of the object to the monitor control unit. The monitor control unit is configured to analyze the one or more images to determine whether an object within the FOV is increasing in size, indicating the object is moving toward the touchless doorbell device, or may determine whether the object is decreasing in size, indicating the object is moving away from the touchless doorbell device. The monitor control unit is configured to analyze the one or more images to determine whether an object within the FOV is not changing in size, indicating the object is walking passed the monitored property. The monitor control unit is also configured to distinguish between a human form object and an animal form of the object within the FOV of the camera.

The camera of the touchless doorbell device captures an image based on detecting motion in a vicinity of the touchless doorbell device (520). The touchless doorbell device may capture one or more images of an object within the field of view of the camera. When the PIR sensor of the camera of the touchless doorbell device detects heat radiated off a living object, the camera may be prompted to capture one or more images and or video data of the object in the FOV. In other implementations, the touchless doorbell device may determine to capture one or more images of an object within the field of view of the camera when the object is determined to be a human form moving towards the monitored property. The resident user may have the ability to customize the use of the touchless doorbell device through the use of the monitoring system application running on a user device. The resident user may set preferences for determining when one or more images and or video data should be captured by the camera of the touchless doorbell device. For example, the user may set preferences to have the camera of the touchless doorbell device capture image data when a human form is walking pass the monitored property, or a human form is walking towards the monitored property. In some examples, the user may set preferences to have the camera of the touchless doorbell device not capture any images of the object when the object is determined to be an animal.

The monitor control unit receives the image from the touchless doorbell device (530). The touchless doorbell device may communicate with the monitor control unit via a wired or wireless data pathway. For example, the touchless doorbell device may communicate with the control unit by a "Wi-Fi" wireless Ethernet (e.g., using low-power Wi-Fi chipsets), Z-Wave, Zigbee, Bluetooth, "HomePlug" or other Powerline networks that operate over AC wiring, and a Category 5 (CAT5) or Category 6 (CAT6) wired Ethernet network.

In some implementations, the monitor control unit determines whether the object within the FOV of the camera of the touchless doorbell is a human or animal form, and determines whether the animal or human is moving towards, away from, or walking by the monitored property. In these implementations, the camera of the touchless doorbell device may capture a first image of the object within the FOV of the camera when the PIR sensor detects the heat emitted from the objection. The camera of the touchless device may then capture a second image of the object within the FOV at a second later time. The camera of the touchless device then communicates the first and second images to the monitor control unit. The monitor control unit analyzes the first and second images to determine the form of the object in the image, and to determine whether the object is moving away from, towards, or walking by the monitored property.

The monitor control unit analyzes the image (540). The monitor control unit is configured to distinguish between a human form object and an animal form of the object within the FOV of the camera. Based on analyzing the image, the monitor control unit determines that the image likely includes a representation of a person (550). The monitor control unit performs a monitoring system action based on determining that the image includes a representation of a person (560).

In some implementations, the monitor control unit may provide for output on a user device of the resident, a notification indicating that a person is likely at the monitored property. In some implementations, the monitor control unit is configured to determine that the image is an image of a known person. The resident user at the monitored property may configure one or more known users that are allowed access to the monitored property. The resident user may configure a profile for each of the one or more known persons. The resident user may provide one or more images of each of the known persons to the monitor control unit through the monitoring system application hosted on a user's device. For example, the resident user may configure himself, his wife, his mother, the nanny, and the dog walker as known persons. In some implementations, the resident user may configure a profile for one or more unwelcomed persons. In these implementations, the resident may provide images of the unwanted persons retrieved from a social media account or from a public record mug shot. For example, the resident user may configure a profile for an ex-spouse. For another example, the resident user may configure a profile for a fired nanny.

The resident user may provide preferences for the action taken by the monitoring system when a known person arrives at the monitored property. For example, the resident user may set preferences to disarm the monitoring system, and automatically unlock the front door of the property when the user himself arrives at the property. For another example, the resident may set preferences to initiate a two-way audio/video communication when the dog walker arrives at the property. For an example, when the person at the property is an unwelcomed guest, the resident may set preferences to arm the monitoring system and lock the front door.

The monitor control unit may analyze the image received from the touchless doorbell device to determine whether the person at the property is a known person or an unknown person. The monitor control unit may use one or more facial recognition software algorithms to determine a likelihood of whether the representation of a person in the person in the received image is a known person. For example, the monitor control unit may determine a confidence score that reflects the likelihood that the person in the one or more captured images is a known user. The monitor control unit may compare the determined confidence score to a threshold, and may determine that the person is likely a known person when the confidence score exceeds the threshold. For example, the monitor control unit may determine a confidence score of 90%, and determines the person is a known person based on the confidence score exceeding the 75% threshold. In some implementations, the resident user may provide preferences for the action to be taken by the monitoring system based on the determined confidence score. For example, the resident user may set preferences to initiate a two-way audio/video communication when the monitor control unit determines the confidence score is 65%, below the 75% threshold, and to automatically disarm the monitoring system and unlock the front door when the monitor control unit determines the confidence score is 95%.

In some implementations, the monitor control unit may adjust the confidence score threshold based on data received from the monitoring system. For example, when the monitoring system is armed away, the monitor control unit may decrease the confidence score threshold. For example, when the monitoring system is armed stay, the monitor control unit may increase the confidence score threshold.

In some implementations, the monitor control unit may generate a notification indicating that a known person is at the monitored property, and provide the notification for output on the user's device. In some examples, the notification may include the one or more captured images of the known person. In some examples, the notification may include a selectable option that requests the user's feedback. For example, the notification may provide the one or more images, and may request user feedback on whether to disarm and unlock the front door, or to provide an audio message, for output by the speaker of the touchless doorbell device instructing the visitor that the resident will be there to open the door shortly.

The monitor control unit may determine the current armed state of the monitoring system, and may perform an action based on the determined state. For example, the monitor control unit determines that the monitoring system is in an unarmed state, and the person at the property is determined to be a known person, the monitoring control unit may unlock and open the front door. For another example, the monitor control unit determines that the monitoring system is in an armed state, and the person at the property is determined to be a known person, the monitoring control unit may disarm the monitoring system and unlock the front door. For another example, the monitor control unit may determine that the monitoring system is in an armed away state, and the person at the property is unknown, the monitor control unit prompt on or more actions at the property that simulate occupancy. For example, the monitor control unit may command one or more lights at the property to switch on, and may output a dog parking sound from a speaker at the property. The one or more lights and the sound of a barking dog may deter the person from potentially burglarizing the monitored property.

The monitor control unit may command a speaker at an interior of the property to output a specific chime sound when a known person is determined to be at the monitored property. The resident user may set preferences for the chime sound to be output for each of a one or more known persons. For example, the user may set a preference for a particular song to be played from a speaker when his mother arrives at the monitored property. In some implementations the monitor control unit may command the speaker at the property to output a specific audio message when a known person is determined to be at the property. For example, the user may set a preference to output "Come in Dad" as an audio message when his father arrives at the monitored property.

In some implementations, the monitor control unit may command the touchless doorbell device to output an audio warning when the monitor control unit cannot make a determination of the identity of the person at the property. For example, a person may approach the front door of the monitored property with a scarf or a ski mask blocking their face. When the monitor control unit receives the one or more images of the person and the face of the person is blocked, the monitor control unit cannot make a determination. The monitor control unit may command the speaker of the touchless device to output an audio message requesting the person unblock their face. The message may indicate that the authorities would be contacted if the person does not have their face uncovered.

In some implementations, the monitor control unit may be configured to determine a level of duress when a known person or the resident arrives at the property with an unknown person. For example, the user may arrive at the property with one or more friends, and the camera of the touchless doorbell device may capture one or more images of each of the persons at the front door. Based on determining a level of duress that is lower than a threshold, the monitor control unit disarms the monitoring system and unlocks the front door to allow the user and his friends to access to the property. For another example, the resident may arrive with another person who is wearing a ski mask, and the camera of the touchless doorbell device may capture one or more images of each of the persons at the front door. Based on determining a level of duress that is higher than the threshold, and based on the monitor control unit not being able to make a determination of the identity of the person with the resident, the monitor control unit may sound an alarm at the property and contact the authorities.

In other implementations, the monitor control unit may be configured to identify one or more user set "alarm expressions." The resident user may set user preferences through the monitoring application that includes an expression that may be used by the user 116 when the resident is in distress, and the authorities should be contacted. For example, the resident user may have been followed home by a burglar who is attempting to force himself into the property, when the user approaches the touchless doorbell device, the resident user may pull on his ear to signal that he is in distress. When the monitor control unit receives the image data indicating the resident user pulling on his ear, the monitor control unit may sound an alarm at the property, and may contact the authorities.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A method to monitor a property, comprising:
    receiving, from a third party system, data about a package;
    analyzing an image captured by a camera at a property to determine whether the image likely includes a representation of a person at the property, whether a face portion of the representation of the person is obstructed, and whether an identity of the person is unknown;
    using a result of the analysis of the image, determining that the image likely includes a representation of a person at the property, that a face portion of the representation of the person is obstructed, and that an identity of the person is unknown;
    in response to determining that the face portion of the representation of the person is obstructed and that the identity of the person is unknown, determining, using the data about the package, whether the person is likely a delivery person; and
    in response to determining that the person is likely a delivery person, determining to skip providing, for output, a message informing the person to remove any obstructions from their face.

2. The method of claim 1, further comprising, in response to determining that the person is likely a delivery person, presenting a different message indicating a location to leave the package.

3. The method of claim 1, wherein data about the package comprises tracking information for the package.

4. The method of claim 1, wherein data about the package comprises data indicating that the package was shipped by a shipping company.

5. The method of claim 1, wherein analyzing the image comprises determining, using the image, one or more of the following:
    whether the image indicates the person wearing a uniform with a company logo,
    whether the image indicates the person holding the package, or
    whether the image indicates a delivery truck at the property.

6. The method of claim 1, wherein determining, using the data about the package, whether the person is likely a delivery person comprises
    determining that the package was shipped by a shipping company to the property.

7. The method of claim 1, wherein the third party system is a system of a shipping company or a merchant website.

8. A system comprising one or more computers and one or more storage devices on which are stored instructions that are operable, when executed by the one or more computers, to cause the one or more computers to perform operations comprising:
    receiving, from a third party system, data about a package;
    analyzing an image captured by a camera at a property to determine whether the image likely includes a representation of a person at the property, whether a face portion of the representation of the person is obstructed, and whether an identity of the person is unknown;
    using a result of the analysis of the image, determining that the image likely includes a representation of a person at the property, that a face portion of the representation of the person is obstructed, and that an identity of the person is unknown;
    in response to determining that the face portion of the representation of the person is obstructed and that the identity of the person is unknown, determining, using the data about the package, whether the person is likely a delivery person; and
    in response to determining that the person is likely a delivery person, determining to skip providing, for output, a message informing the person to remove any obstructions from their face.

9. The system of claim 8, comprising a touchless doorbell that includes the camera.

10. The system of claim 8 wherein the third party system is a system of a shipping company or a merchant website.

11. The system of claim 9, wherein the touchless doorbell comprises a speaker that presents a different message about where on the property the delivery person should leave the package in response to determining that the person is likely a delivery person.

12. The system of claim 8, wherein data about the package comprises tracking information for the package.

13. The system of claim 8, wherein data about the package comprises data indicating that the package was shipped by a shipping company.

14. The system of claim 8, wherein analyzing the image comprises determining, using the image, one or more of the following:
    whether the image indicates the person wearing a uniform with a company logo,
    whether the image indicates the person holding the package, or
    whether the image indicates a delivery truck at the property.

15. The system of claim 8, wherein determining, using the data about the package, whether the person is likely a delivery person comprises determining that the package was shipped by a shipping company to the property.

16. One or more non-transitory storage media encoded with instructions that, when executed by one or more computers, cause the one or more computers to perform operations comprising:
    receiving, from a third party system, data about a package;
    analyzing an image captured by a camera at a property to determine whether the image likely includes a representation of a person at the property, whether a face portion of the representation of the person is obstructed, and whether an identity of the person is unknown;
    using a result of the analysis of the image, determining that the image likely includes a representation of a person at the property, that a face portion of the representation of the person is obstructed, and that an identity of the person is unknown;

in response to determining that the face portion of the representation of the person is obstructed and that the identity of the person is unknown, determining, using the data about the package, whether the person is likely a delivery person; and in response to determining that the person is likely a delivery person, determining to skip providing, for output, a message informing the person to remove any obstructions from their face.

17. The media of claim 16, wherein the operations further comprises, in response to determining that the person is likely a delivery person, presenting a different message indicating a location to leave the package.

18. The media of claim 16, wherein data about the package comprises tracking information for the package.

19. The media of claim 16, analyzing the image comprises determining, using the image, one or more of the following:
whether the image indicates the person wearing a uniform with a company logo,
whether the image indicates the person holding the package, or
whether the image indicates a delivery truck at the property.

20. The media of claim 16, wherein determining, using the data about the package, whether the person is likely a delivery person comprises determining that the package was shipped by a shipping company to the property.

\* \* \* \* \*